(12) United States Patent
Waybright

(10) Patent No.: US 7,401,575 B2
(45) Date of Patent: Jul. 22, 2008

(54) SYSTEM, APPARATUS AND METHOD FOR REMOVING LARGE ANIMAL WASTE FROM A FLOOR

(76) Inventor: Bert J. Waybright, 1865 Mason Dixon Rd., Gettysburg, PA (US) 17325

( * ) Notice: Subject to any disclaimer, the term of this patent is extended or adjusted under 35 U.S.C. 154(b) by 218 days.

(21) Appl. No.: 11/121,205

(22) Filed: May 4, 2005

(65) Prior Publication Data

US 2006/0249092 A1 Nov. 9, 2006

(51) Int. Cl.
*A01K 1/01* (2006.01)
(52) U.S. Cl. .................................................... 119/451
(58) Field of Classification Search ................ 119/442, 119/447, 450, 451
See application file for complete search history.

(56) References Cited

U.S. PATENT DOCUMENTS

| | | | |
|---|---|---|---|
| 1,426,653 A | | 8/1922 | Kruse |
| 2,768,734 A | | 10/1956 | Klinzing |
| 3,456,779 A | | 7/1969 | Andreae |
| 3,799,330 A | | 3/1974 | Floter |
| 3,985,103 A | * | 10/1976 | Gallei ..................... 119/447 |
| 4,123,992 A | * | 11/1978 | Laurenz ................... 119/451 |
| 4,208,279 A | * | 6/1980 | Varani ...................... 210/613 |
| 4,243,137 A | * | 1/1981 | Laurenz ................... 198/748 |
| 4,280,447 A | * | 7/1981 | Laurenz ................... 119/451 |
| 4,319,678 A | | 3/1982 | Hesler |
| 4,320,008 A | | 3/1982 | Kokubo |
| 4,354,593 A | | 10/1982 | Diedrich |
| 4,489,675 A | * | 12/1984 | Siciliano .................. 119/442 |
| 4,708,294 A | * | 11/1987 | Endom ...................... 241/27 |
| 4,787,338 A | * | 11/1988 | Stanley et al. ............. 119/451 |
| 4,887,550 A | * | 12/1989 | Pirovano ................. 119/56.2 |
| 4,913,095 A | * | 4/1990 | Morrow et al. ............ 119/450 |
| 5,076,212 A | * | 12/1991 | Thompson et al. ........ 119/437 |
| 5,289,912 A | * | 3/1994 | Faulstich ................. 198/718 |
| 5,450,815 A | | 9/1995 | Krehl et al. |
| 5,607,046 A | * | 3/1997 | Krehl et al. .............. 198/741 |
| 5,662,068 A | * | 9/1997 | Childs ..................... 119/451 |
| 5,740,763 A | * | 4/1998 | Hollingsworth .......... 119/442 |
| 6,446,298 B1 | * | 9/2002 | Berg et al. ................ 15/93.1 |
| 6,467,432 B1 | * | 10/2002 | Lewis et al. .............. 119/442 |
| 6,948,450 B2 | * | 9/2005 | Berg ....................... 119/451 |

(Continued)

FOREIGN PATENT DOCUMENTS

DE 10 68 179 B 10/1959

(Continued)

*Primary Examiner*—Yvonne R. Abbott
(74) *Attorney, Agent, or Firm*—Lowe Hauptman Ham & Berner LLP

(57) ABSTRACT

Animal waste is removed from a barn floor by moving a trolley in a first direction adjacent a first trough in the floor. As the trolley moves in the first direction: a blade extending from the trolley scrapes the waste into a region adjacent the trough; rotating paddles on the trolley drive the waste from the region into the trough; and a plow on the trolley that extends into the trough drives the waste toward one end of the trough for removal. Alternatively water drives the waste in the trough in the first direction. When the trolley moves away from the one end, the blades scrape the waste toward the region and the paddles drive the waste into the trough, but the plow is idle because the plow pivots to ride on top of the waste.

14 Claims, 4 Drawing Sheets

U.S. PATENT DOCUMENTS 7,013,837 B2 * 3/2006 Chun .................. 119/447

FOREIGN PATENT DOCUMENTS

| DE | 43 43 760 A1 | 6/1995 |
|---|---|---|
| FR | 2 303 468 A | 10/1976 |
| GB | 1 246 590 A | 9/1971 |
| WO | 94/07358 A | 4/1994 |
| WO | 95/22889 A1 | 8/1995 |

* cited by examiner

SYSTEM, APPARATUS AND METHOD FOR REMOVING LARGE ANIMAL WASTE FROM A FLOOR

BACKGROUND

The present invention relates to systems and methods for collecting animal waste, and more particularly, to systems and methods for removing manure from a floor of barn.

Systems and methods for automatically collecting and disposing of animal waste products are often desired to eliminate the manual labor associated with such tasks. Such automated systems and methods are especially desirable when dealing with a large number of farm animals in an environment where the animal waste cannot be left to naturally degrade.

Prior art systems have been developed to deal with this problem, however, there are a number of drawbacks associated with these prior art systems. For example, plows have been used to push animal waste across a floor to a collection area. Such systems may not work very effectively, however, due to the potentially large volume and weight of animal waste collected against the plow. Other systems have been developed to reduce the load on the plow by diverting the animal waste through an opening into a collection area below the floor. These systems are disadvantageous, however, because they require a very wide opening to avoid clogging of the opening by the animal waste. Such a large opening is not practical on a floor where a large farm animal walks. Additionally, other systems utilize a false floor having many openings or slots to form a grated false floor. Thus, the current animal waste collection systems of which I am aware have one or more drawbacks.

Therefore, new and improved animal waste collection systems are desired to effectively collect and dispose of animal waste.

BRIEF SUMMARY

In accordance with one aspect, the present invention provides an inexpensive yet efficient system, apparatus and method for the automated collection and removal of animal waste.

In a first aspect of the invention, an apparatus for removing animal waste from a floor including a trough comprises a trolley body movable in at least a first direction along the trough. The apparatus further includes an arm connected to the trolley body and operable for collecting the animal waste from the surface during movement of the trolley body in the first direction. The arm and the trolley body define a region for receiving the animal waste collected by the first arm. This region is adjacent the trough. Additionally, the apparatus includes an urging mechanism attachable to the trolley body and positionable adjacent the region. The urging mechanism is operable to provide a driving force to move the animal waste received by the region into the trough.

In another aspect of the invention, an animal waste removal system comprises a surface having at least one edge defining an opening to a trough and a trolley body movable in at least a first direction along the trough. The system further includes an arm connected to the trolley body and operable for removing the animal waste from the surface during movement of the trolley body in the first direction. The arm and the trolley body define a region for receiving the animal waste removed by the arm. The region is adjacent the trough. Additionally, the system includes an urging mechanism attachable to the trolley body and positionable adjacent the region. The urging mechanism is operable to move the animal waste supplied to the region into the trough.

Another aspect of the invention relates to a method of removing animal waste from random locations on a floor by moving the animal waste from the random locations into an elongated region proximate a trough in the floor. The animal waste is driven from the region into the trough, and is then moved in the trough toward one end of the trough.

In a further aspect of the invention, a system for removing animal waste from a barn floor comprises a trough in the floor, a trolley positioned adjacent or above the trough, and a drive for moving the trolley in first and second opposite directions along the trough. The trolley includes: (a) a blade arrangement extending from a body of the trolley for scraping waste from the floor into a region adjacent the trough and in front of the body in the direction of travel of the trolley as the trolley is moved in the first and second directions; and (b) at least one paddle mounted for rotation about a horizontal axis for driving waste from the region into the trough as the trolley is moved in the first and second directions. The system also an arrangement for driving waste in the trough in at least one of the directions Additional aspects and advantages of the present invention are set forth in part in the description which follows, and in part are obvious from the description, or may be learned by practice of the present invention. The aspects and advantages of the present invention may also be realized and attained by the means of the instrumentalities and combinations particularly pointed out in the appended claims.

BRIEF DESCRIPTION OF THE DRAWINGS

The various embodiments of the present invention are hereinafter described in conjunction with the appended drawings, provided to illustrate and not to limit the present invention, wherein like designations denote like elements, and in which.

DETAILED DESCRIPTION

Figure 1:
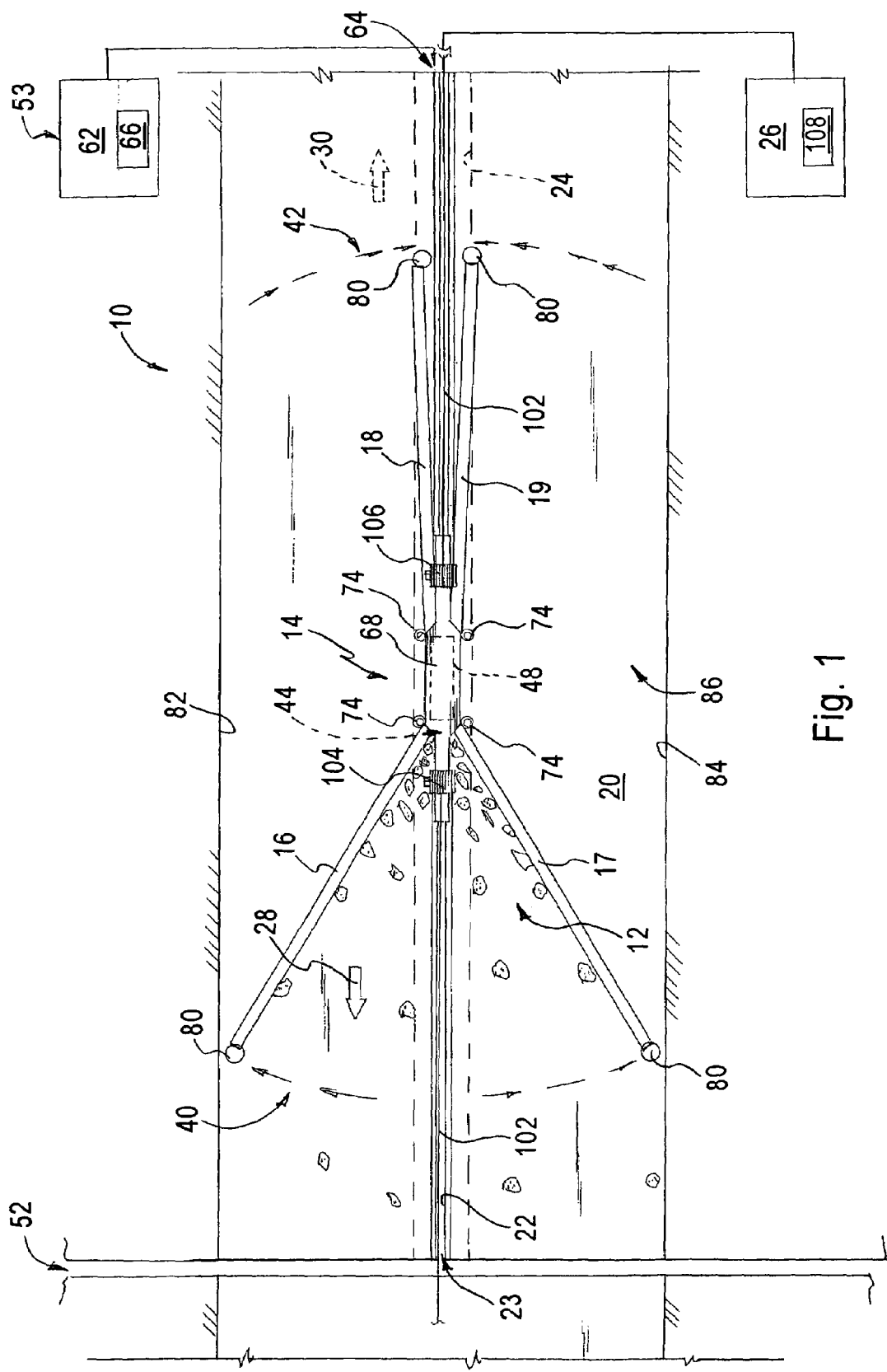
FIG. 1 is a top view of one embodiment of a large animal waste collection system including a trolley having a first and second sets of arms for collecting large animal waste deposited on a barn floor.

Referring to FIGS. 1-5, in one embodiment, a system 10 for collecting animal waste 12 includes a trolley 14 having first and second sets of extendable arms 16, 17 and 18, 19 for removing large animal waste 12 from a floor 20 of a free stall barn alley. Animal waste 12 includes a slurry of liquids and solids excreted by large animals, such as urine and manure from farm animals, particularly cattle and pigs. Floor 20 extends from downwardly-extending edge or wall 22, or alternatively between two downwardly-extending edges or walls that define a longitudinally-extending slot 23. Slot 23 is an opening in floor 20 to a first trough or tube 24 into which animal waste 12 is deposited by arms 16, 17 or 18, 19 of trolley 14, depending direction of movement of the trolley. A drive system 26 drives trolley 14 in a first direction 28 and an opposite second direction 30 along the length of edge 22 to collect animal waste 12.

Arms 16, 17 and 18, 19 are pivotable relative to each other into an open position 40 and a closed position 42, depending on the relative movement of trolley 14. Opening and closing of arms 16-19 is in response to frictional engagement of the arms with floor 20. Each of arms 16, 17 and 18, 19 includes a respective blade portion 32, 34, 36, 38 for engaging floor 20 in open position 40 such that at least one of the blades pushes animal waste 12 toward a respective region 44, 46 (FIGS. 2 and 3) adjacent the proximal end of the respective blade with respect to the body of trolley 14 and edge 22. Each region 44, 46 thereby opens to first trough 24 so the collected animal waste 12 drops into first trough 24. To remove animal waste 12 from each region 44, 46, trolley 14 carries an urging mechanism 48 that includes flat surface 50 (FIG. 3) adjacent each region 44, 46. As trolley 14 moves along slot 23, surface 50 drivingly forces the collected animal waste 12 through the respective region 44, 46 and into first trough 24. For example, referring to FIG. 1, when trolley 14 moves in first direction 28, region 44 is located between arms 16, 17 and in front of urging mechanism 48, defined as a paddle wheel. Surface 50 (FIG. 3) is formed as one side of a paddle that rotates through region 44 with movement of trolley 14 in direction 28, thereby moving any animal waste 12 from region 44 to first trough 24 (FIG. 3).

When trolley 14 gets to an end of slot 23, typically located at an end of an alley in a free stall barn, after traveling in first direction 28, drive system 26 is reversed, causing trolley 14 to move back in the opposite (second) direction 30. When trolley 14 moves back in the second direction 30, first set of arms 16, 17 that were in open position 40 and pushing animal waste 12 toward edge 22 automatically retract by friction toward edge 22 and move into closed position 42. At about the same time, the opposite or second set of arms 18, 19 on what is now the front of trolley 14 move outwardly to repeat the process as trolley 14 moves in second direction 30.

Additionally, a removal system 53 extends into trough 24 to move animal waste 12 deposited in first trough 24 into an adjoining second trough 52. Second trough 52 extends perpendicularly to trough 24, but can be oblique relative to first trough 24 and/or located at any intermediate point thereof. It is to be understood that a pair of second troughs can be provided, one at each end of trough 24.

Figure 3:
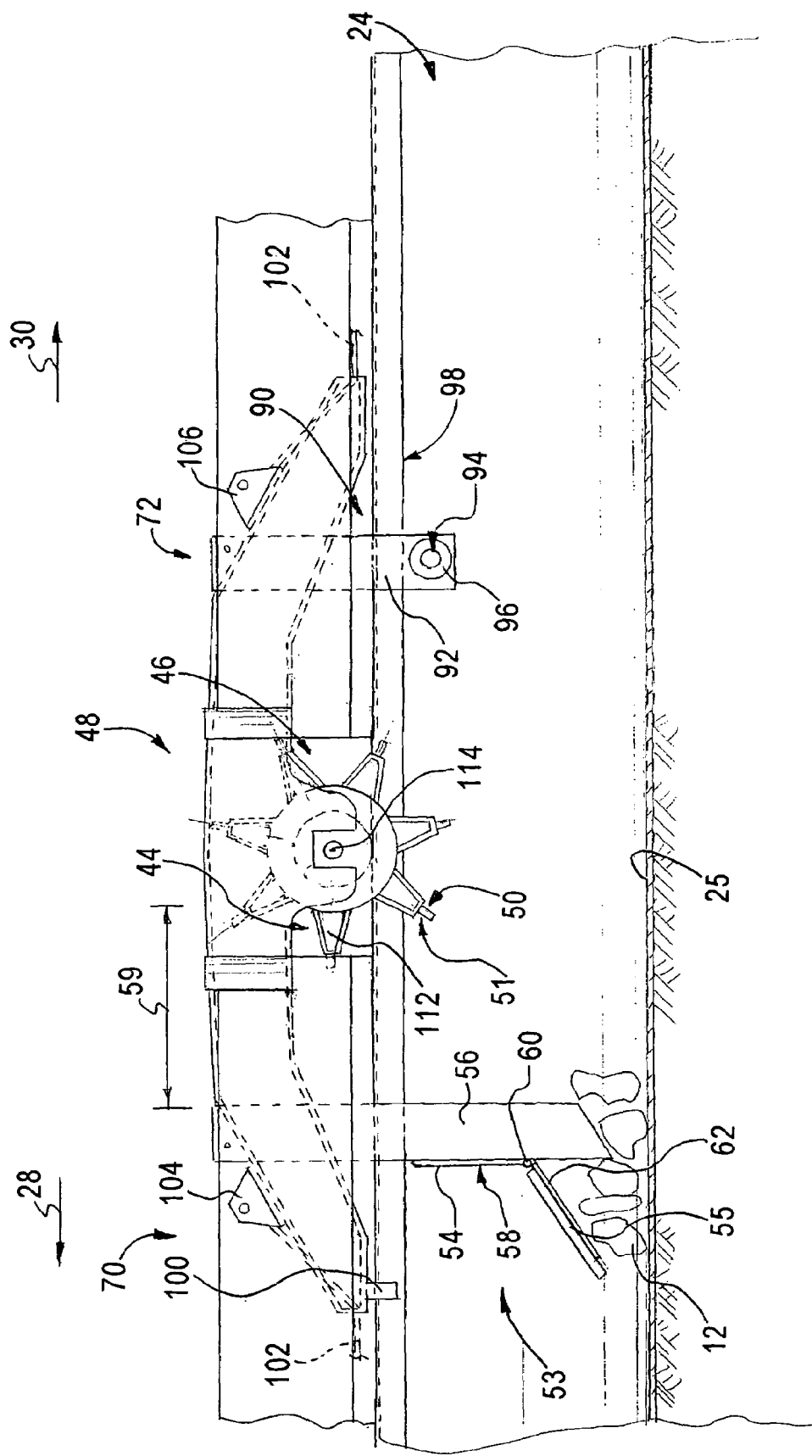
FIG. 3 is a partial sectional side view of the trolley and trough of FIG. 1.
Figure 5:
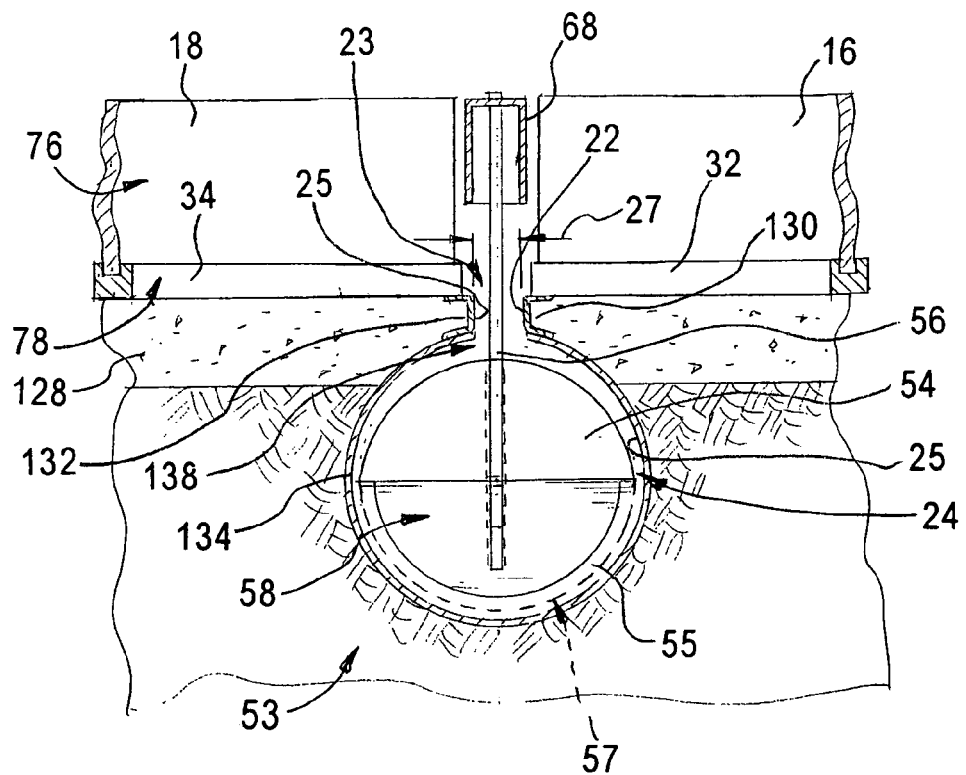
FIG. 5 is a cross-sectional view of the trolley and the trough along line 5-5 of FIG. 2.

Referring to FIGS. 3 and 5, removal system 53 includes a plow 54 rigidly connected by an elongated member 56 to trolley 14 so it extends into first trough 24. Plow 54 and elongated member 56 are formed of any substantially rigid material, such as metal, plastic, composites, ceramics, and combinations thereof. Plow 54 is oriented within first trough 24 to move animal waste 12, such as dry, i.e., stiff, manure which was dropped by heifers (stiff because of the diet of the heifers), through an outlet of first trough 24 and into an inlet of second trough 52. Plow 54 includes a gathering surface 58 that extends over a predetermined cross-section of trough 24 to contact and move the collected animal waste 12 as trolley 14 is being moved. Gathering surface 58 includes one or more planar, curved or curvilinear surfaces positioned relative to the bottom and/or side of trough 24 to engage and move animal waste 12. For example, plow 54 includes a substantially planar gathering surface 58 oriented substantially perpendicular to both the bottom and sides of trough 24. Plow 54 is positioned toward one longitudinal end of trolley 14, located a sufficient distance 59 ahead of urging mechanism 48 to assure a flow of collected animal waste 12 to urging mechanism 48. In one embodiment, plow 54 is positioned on the end of trolley 14 that is closest to a second trough 52. As such, when trolley 14 moves in first direction 28, plow 54 pushes the animal waste 12 that was collected on the previous traversals (but not the present traversal) of trolley 14 along trough 24 toward second trough 52.

Plow 54 includes an outer portion 55 that extends from edge 57 (FIG. 5) of the plow to engage a surface 25 at the bottom, and in some embodiments at least a portion of the side, of trough 24. Outer portion 55 is preferably formed from a material having a greater flexibility, or a lesser coefficient of friction, than the material of plow 54. For example, outer portion 55 is typically formed of rubber, elastomers, metal, plastic, composites, ceramics, and/or combinations thereof.

Plow 54 includes a hinge mechanism 60 arranged so that at least a portion 62 of plow 54 connected to the hinge mechanism is free to pivot about the hinge mechanism as the plow moves in second direction 30, i.e., away from the end of the alley where second trough 52 is located. As a result, plow portion 62 rotates upward and rides over the top of the collected animal waste 12 in trough or tube 24 as trolley 14 is moving away from second trough 52. Such a hinged mechanism 60 may not be necessary if another trough is located at the opposite end of first trough 24, i.e. such that movement of trolley 14 in second direction 30 causes plow 54 to move animal waste 12 from first trough 24 into this additional trough. Additionally, plow 54 may not be necessary for some forms of animal waste 12, such as wet manure, as is excreted by cows because of their diet. In an embodiment where first trough 24 is inclined toward second trough 52, animal waste 12 in the form of wet manure collected in first trough 24 may flow by gravitational force toward second trough 52.

Alternatively or additionally to plow 54, as illustrated in FIG. 1, removal system 53 includes a fluid injection system 62 for injecting a high pressure fluid (typically water) from a suitable source into outlet 64 at one end of first trough 24. Outlet 64 is positioned so the fluid flowing through it flows in trough 24 in a direction to provide a removal force to flush the collected animal waste 12 in trough 24 into one or more second troughs 52, such as a trough at the end of the alley. Fluid injection system 62 includes a pressurizing mechanism 66 in communication with a pipe that ends at outlet 64.

Referring to FIGS. 1-3 and 5, trolley 14 includes a trolley body 68 having at first end 70 and a second end 72 to which first and second sets of arms 16, 18 respectively are movably mounted. In one embodiment, hinge mechanism 74 has a substantially vertical axis about which the proximate portions of arms 16, 17 and 18, 19 are pivotably connected to trolley body 68 to allow movement between open position 40 and closed position 42. Trolley body 68 and arms 16, 17 and 18, 19 may be formed of a substantially rigid material, such as metal, plastic, a composite, a ceramic, a rubber or elastomers, and combinations thereof.

Figure 2:
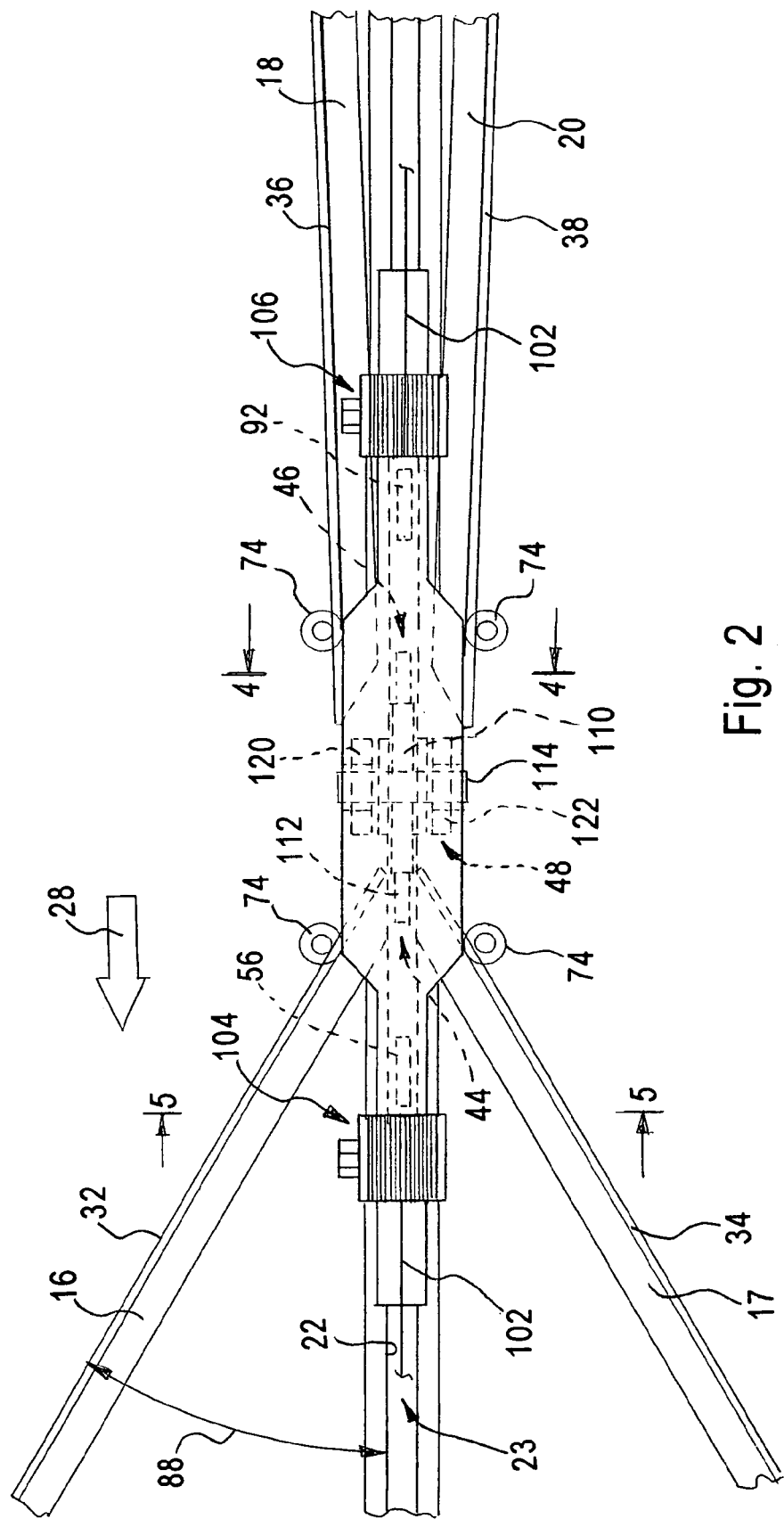
FIG. 2 is an enlarged top view of a portion of the trolley of FIG. 1.

Referring specifically to FIGS. 2, 3 and 5, each blade 32, 34, 36, 38 is rigidly connected to a respective arm 16, 17, 18, 19 and extends between the respective arm and surface 20. Blades 32, 34, 36, 38 are positioned to rest on floor 20 to effectively scrape floor 20 that, in combination with the movement of trolley 14 causes the opening and closing movements of the blades and dislodging and removal of animal waste 12. Blades 32, 34, 36, 38 can be integrally formed with, or fixedly or removably attached to, arms 16, 17, 18, 19. A removable attachment may be desired, for instance, to enable replacement of worn or damaged blades 32, 34, 36, 38.

Arms 16, 17, 18, 19 and blades 32, 34, 36, 38 each have a respective collecting surface 76, 78 that faces the direction of movement of trolley 14, e.g. first direction 28 or second direction 30, when the respective arms and blades are in an open position 40 for collecting animal waste 12. Each of collecting surfaces 76, 78 can include linear portions, curved portions, or combinations thereof.

In alternate embodiments, hinge mechanism 74 can include an actuator mechanism, such as a separate motor or mechanical linkages associated with drive system 26, to drive arms 16, 17 and 18, 19 between open position 40 and closed position 42 depending on a direction of movement of trolley 14.

Referring again to FIG. 1, a bumper member 80 is attached to a distal end of each arm 16, 17, 18, 19 to engage one of an opposing set of outer edges or walls 82, 84 that extend above surface 20 to define an alley 86 within which trolley 14 moves. It should be noted, however, that alley 86 can include only one edge or wall extending above surface 20, or a combination of one or more upwardly extending edges/walls and one or more downwardly extending edges/walls, such as edge/wall 22. Bumper 80 protects the distal end of each arm 16, 17, 18, 19 from wear that may occur with movement against edge or wall 82. Bumper 80 is preferably formed of a plastic, rubber, metal, ceramic or composite material, or any combination thereof and can have any shape. For instance, bumper 80 can include a cylindrical body having a longitudinal axis extending substantially parallel to edge or wall 82.

In moving between open position 40 and closed position 42, each arm 16, 17, 18 and 19 moves between a predetermined range of angles 88 relative to the movement of trolley in first direction 28 and second direction 30. For instance, a suitable predetermined range of angles 88 is from between about 0 degrees and less than 90 degrees in a first embodiment, or from about 0 degrees to about 75 degrees in a second embodiment, or from about 0 degrees to about 55 degrees in a third embodiment. To this end, trolley 14 is designed to carry arms 16, 17 and 18, 19 of a predetermined length to achieve one of the predetermined range of angles 88, depending on a given width of alley 86.

Trolley 14 is guided for movement relative to edge or wall 22 by a guide member 90, rigidly connected to trolley body 68 and having at least one guide surface 92 movable against edge or wall 22. Guide surface 92 forms at least one exterior surface or side of guide member 90. In an embodiment where edge or wall 22 extends vertically relative to floor 20, guide surface 92 extends substantially parallel to edge or wall 22 to limit horizontal movement between edge or wall 22 and guide surface 92, and hence trolley 14. Guide member 90 includes an additional guide surface 94 movable against a second surface 98 of first trough 24. For example, as illustrated in FIG. 3, guide surface 94 includes a curved surface of a roller 96 that may contact a top, inside surface 98 of a substantially closed trough or tube 24. Guide surface 94 thereby limits relative vertical movement between trolley 14 and top, inside surface 98 to maintain blades 32, 34, 36, 38 in contact with floor 20.

Another guide member 100 is rigidly connected to first end 70 of trolley body 68 when guide member 90 is positioned at second end 72. Guide member 100 includes an elongated pin that contacts edge or wall 22 to limit relative horizontal motion between edge or wall 22 and trolley 14. In other embodiments, either or both guide members 100 and 90 can include elongated plate structures, roller structures, pin structures, combinations thereof, or any other structure capable of limiting any component of the relative movement between trolley 14 and edge/wall 22 or first trough 24.

Figure 4:
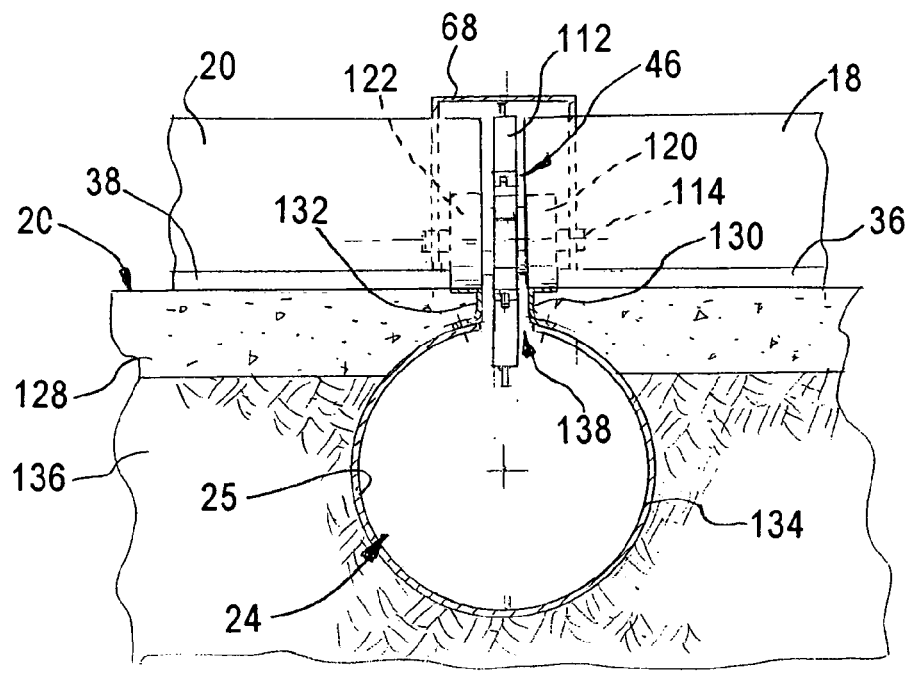
FIG. 4 is a cross-sectional view of the trolley and the trough along line 4-4 of FIG. 2.

Referring to FIGS. 1, 4 and 5, floor 20 is a continuous surface, such as a concrete floor. Floor 20 is bound by upwardly extending walls 82, 84 that define alley 86, which is further defined by a downwardly extending wall or edge 22 that opens to trough 24. Additionally, edge or wall 22 may oppose an additional downwardly extending edge or wall 25 to define slot 23. Slot 23 has a width 27, sized to prevent the hoof or leg of the type of animal that is resident in alley 86 from becoming caught in slot 23. For example, width 27 is sized such that the leg or hoof of a relatively large farm animal, such as cattle and pigs, cannot get caught in slot 23. For instance, width 27 may range from about 0.5 inches to about 4 inches, or in another embodiment from about 1 inch to about 3 inches, or in another embodiment from about 1 inch to about 2 inches.

Slot 23 includes liner portions 130, 132 extending vertically, and alternately, horizontally above and/or below slot 23, to resist wear from contact with guide members 90, 100 and urging mechanism 48. For example, liner portions 130, 132 can be formed from metals, plastics, composites, ceramics, etc. Trough 24 includes a liner portion 134 made from similar materials. Slot 23 is formed by spaced apart, longitudinally-extending, u-shaped, metal liner portions 130, 132 that are set in a concrete base 128 that forms floor 20.

Trough 24 may be lined by a longitudinally extending pipe 134, set in an earth foundation 136 below the concrete that forms floor 20. Pipe 134 includes a longitudinal slot 138 that opens to slot 23, whereby animal waste 12 collected by system 10 flows through slot 138 and is deposited in trough 24. Secondary troughs 52 can be constructed in a similar manner to trough 24. Although trough 24 is preferably a central trough, it can be located at any position within alley 86. Additionally, although trough 24 is shown as being accessible through slot 23, trough 24 can be an open channel adjacent surface 20.

Drive system 26 can be any system that drives trolley 14 in first direction 28 and second direction 30. Preferably drive system 26 includes cable 102, having ends fixedly attached to first and second ends 70, 72 of trolley 14 by attachment mechanisms 104, 106, such as a bolt, screw or clamp. Drive system 26 includes reversible motor 108 having a spindle on which cable 108 is wound Urging mechanism 48 can be any mechanism attachable to trolley 14 that transfers a continuous or discontinuous driving force to the collected animal waste 12 in areas 44, 46 to drive animal waste 12 into first trough 24. For example, urging mechanism 48 can apply the driving force in a direction perpendicular, in a downward direction, or oblique to floor 20.

Urging mechanism 48 includes an inner wheel 110 having plural outwardly extending, radially-spaced paddles 112, that extend below floor 20 adjacent edge/wall 22 and into slot 23 and trough 24 to move animal waste 12 within first or second region 44, 46 into first tube or trough 24. Inner wheel 110 turns on a shaft 114, rotatably connected to trolley body 68. Paddles 112 each include two opposed surfaces 50 and 51 that respectively contact the collected animal waste 12 in the respective region 44, 46 depending on the direction of rotation of inner wheel 110, which depends on a direction of movement of trolley 14. Paddles 112 are substantially rigid to effectively engage and drive animal waste 12 into trough 24. Surfaces 50, 51 can be straight, curved or a combination thereof along either their length or width.

Shaft 114 carries outer wheels 120 and 122, located on opposite sides of slot 23, to drive inner wheel 110 and paddles 112 as a result of the frictional engagement of the outer wheels with floor 20. One or both outer wheels 120, 122 thereby drive a respective surface 50, 51 of one of paddles 112 through a respective region 44, 46 to move animal waste 12 collected by a respective blade 32, 34, 36, 38 into first trough 24. Wheels 110, 120, 122 and paddles 112 can be formed integrally or separately from the same material or, individually or in combination, from different materials. Suitable materials for wheels 110, 120, 122 and paddles 112 include metals, composites, ceramics, rubbers, elastomers, and combinations thereof.

In alternate embodiments, urging mechanism 48 includes an elongated plate or U-shaped portion (not shown) that extends downwardly at an angle from the proximate ends of the respective blades 32, 34, 36, 38 at a respective one of regions 44 or 46 to a position below floor 20. In this embodiment, the elongated plate or U-shaped portion is configured to capture animal waste 12 collected by the respective blades 32, 34, 36, 38 and transferred to the respective region 44, 46 and, due to the inclined downward angle, impart a continuous downward force to move the collected animal waste 12 into trough 24. In yet a further embodiment, urging mechanism 48 includes an actuator, such as a piston, attached to a movable surface (not shown), such as a plate, to reciprocatingly push the collected animal waste 12 from the respective region 44, 46 to first trough 24.

While the various embodiments of the present invention have been illustrated and described, it will be clear that the present invention is not limited to these embodiments only. For example, while illustrated as having two pairs of arms and blades that pivot with respect to each other depending on direction of movement, it is possible to have a single arm that pivots to collect the waste in both directions. Alternatively, it is possible to have only two arms with blades, either two opposing pairs that pivot to collect the animal waste in both directions of movement or two on either end of the body that pivot so that only one arm/blade collects animal waste in a given direction of movement. The system can operate in only a single direction of movement, for example, by having only one pair of arms that opens when the trolley moves in a given direction. Numerous other modifications, changes, variations, substitutions and equivalents will be apparent to those skilled in the art without departing from the spirit and scope of the present invention as described in the claims.

What is claimed is:

1. A system for removing animal waste from a barn floor on which the animals that produce the waste reside comprising a trough in the floor, a pair of opposing walls defining a slot region opening from the floor to the trough, the trough and slot being straight and elongated in the same direction, a trolley positioned adjacent or above the trough, a drive for moving the trolley in first and second opposite directions along the slot region, the trolley comprising a blade arrangement extending from a body of the trolley for scraping waste from the floor into the slot region in front of a portion of the body in the direction of travel of the trolley as the trolley is moved in the first and second directions.

2. The system of claim 1, wherein the trolley further comprises at least one paddle mounted for rotation about a horizontal axis for driving waste from the region into the trough as the trolley is moved in the first and second directions; and an arrangement for driving waste in the trough in at least one of the directions.

3. The system of claim 2, wherein the at least one paddle is arranged to rotate between positions above the floor to positions within the trough and slot.

4. The system of claim 2 wherein the at least one paddle is frictionally coupled with the floor so that the at least one paddle is rotated about the horizontal axis in response to the drive moving the trolley in the first and second directions.

5. The system of claim 4 wherein the drive includes a motor driven cable to which the trolley is fixedly attached.

6. The apparatus of claim 4, wherein the functional coupling comprises a wheel, the wheel rotatably mounted to the trolley and engageable with the floor during movement in the first and second directions to rotatably drive the paddles.

7. The system of claim 1 further including an arrangement for driving waste in the trough, wherein the arrangement for driving waste in the trough includes a plow carried by the trolley, the plow being arranged so that it (a) engages and drives the waste in the trough in the first direction as the trolley is moved in the first direction, and (b) rides on top of the waste in the trough as the trolley is moved in the second direction so that the waste in the trough is not moved in the trough in the second direction as the trolley is moved in the second direction.

8. The system of claim 7, further comprising a second trough coupled with an end of the trough where the first direction of trolley movement ends so that animal waste collected in the trough can flow to the second trough.

9. The system of claim 1 further including an arrangement for driving waste in the trough, wherein the arrangement for driving waste in the trough includes an outlet for a high-pressure liquid source, the outlet being positioned for causing liquid from the source to drive the waste in the trough in the first direction.

10. The system of claim 9, further comprising a second trough coupled with an end of the trough where the first direction of trolley movement ends so that animal waste collected in the trough can flow to the second trough.

11. The system of claim 1 wherein, in planes at right angles to the first and second directions, the distance between the opposing walls of the slot is considerably less than the distance between opposite sides of the trough, the distance between the opposing walls being such that the animals resident on the floor will not have their hoof or leg caught in the slot.

12. The system of claim 1 wherein the blade arrangement includes a pair of blades; the blades being located toward a first end of the trolley; the first end being the forward end of the trolley while the trolley moves in the first direction; the trolley and the blades being arranged so that (a) the blades are open in a waste collecting position while the trolley moves in the first direction, and (b) the blades are closed while the trolley moves in the second direction, the blades when in the open waste collecting position being approximately in the shape of a V having an apex on the trolley.

13. The apparatus of claim 1, further comprising a guide member fixedly connected to the trolley and having a guide surface arranged to be located in the trough, the guide surface being arranged to limit lateral movement of the trolley relative to the trough.

14. The system of claim 1 wherein the blade arrangement includes first and second sets of blades; each set of blades including a pair of blades; the first and second sets of blades being located toward first and second opposite ends of the trolley, respectively; the first and second ends of the trolley being the forward ends of the trolley while the trolley moves in the first and second directions, respectively; the trolley and the blades being arranged so that (a) the first set of blades is open in a waste collecting position and the second set of blades is closed while the trolley moves in the first direction, and (b) the first set of blades is closed and the second set of blades is open in a waste collecting position while the trolley moves in the second direction, the blades when in the open waste collecting position being approximately in the shape of a V having an apex on the trolley.

* * * * *